Figure 1:
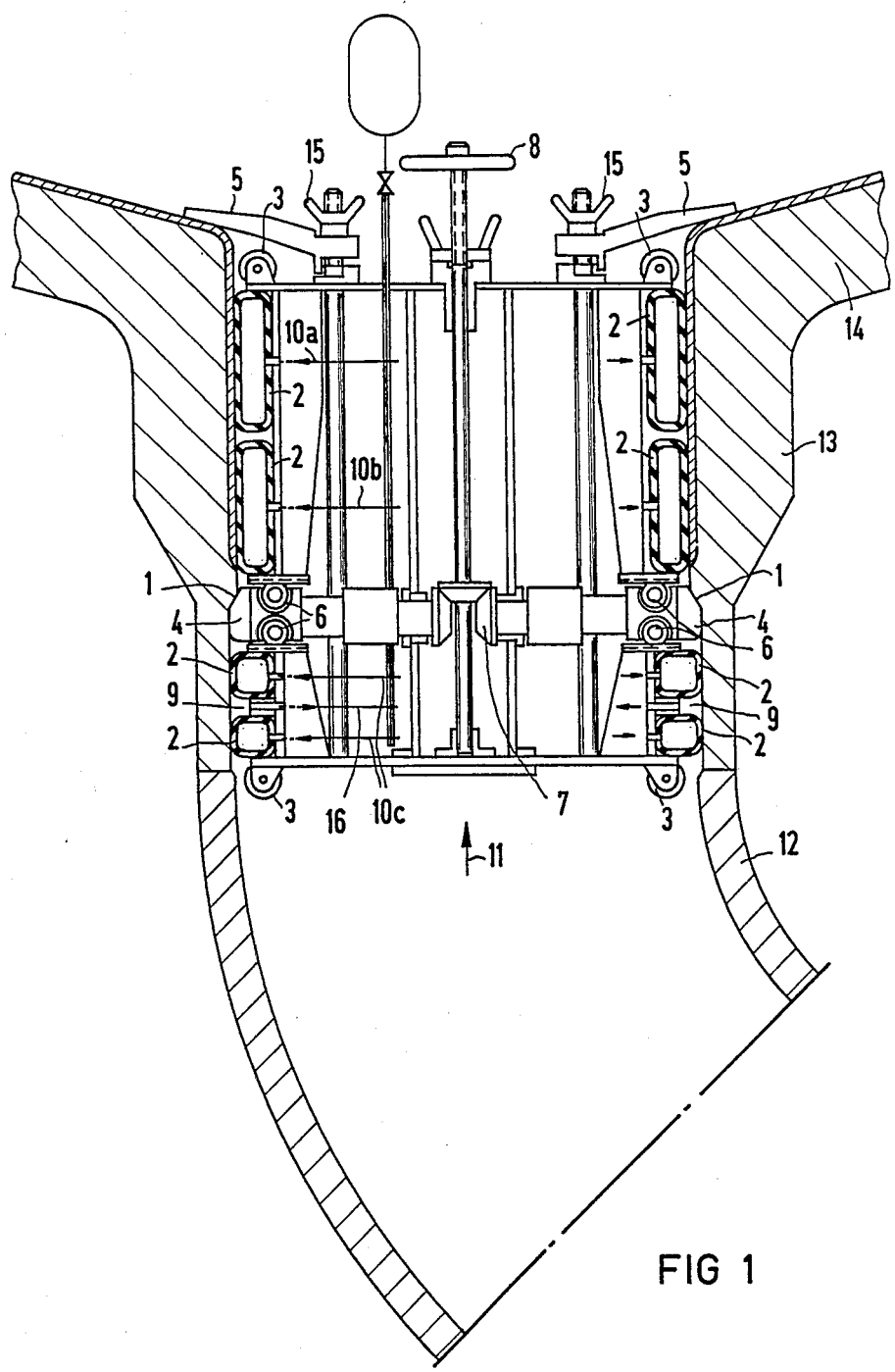

United States Patent [19]

Stauner et al.

[11] Patent Number: 4,848,406

[45] Date of Patent: Jul. 18, 1989

[54] SEALING DEVICE FOR A PIPELINE, IN PARTICULAR FOR A LOOP LINE OF A STEAM GENERATOR HEMISPHERE

[75] Inventors: Jakob Stauner; Johannes Stoss, both of Nuremberg, Fed. Rep. of Germany

[73] Assignee: Siemens Aktiengesellschaft, Munich, Fed. Rep. of Germany

[21] Appl. No.: 150,884

[22] Filed: Feb. 1, 1988

[30] Foreign Application Priority Data

Sep. 11, 1987 [DE] Fed. Rep. of Germany ....... 3730658

[51] Int. Cl.$^4$ .............................................. F16L 55/12
[52] U.S. Cl. ........................................ 138/93; 138/89; 376/204
[58] Field of Search ............................ 138/89, 90, 93; 376/204, 203; 270/232

[56] References Cited

U.S. PATENT DOCUMENTS

| | | | |
|---|---|---|---|
| 3,537,483 | 11/1970 | Teague | 138/93 |
| 4,160,612 | 7/1979 | Britton et al. | 138/89 |
| 4,262,702 | 4/1981 | Streich | 138/89 |
| 4,393,899 | 7/1983 | Tsuji et al. | 138/89 |
| 4,591,477 | 5/1986 | Retlew | 138/93 |
| 4,637,588 | 1/1987 | Wilhelm et al. | 138/93 |
| 4,667,701 | 5/1987 | Evans et al. | 138/93 |
| 4,671,326 | 6/1987 | Wilhelm et al. | 138/93 |
| 4,690,172 | 9/1987 | Everett | 138/89 |

FOREIGN PATENT DOCUMENTS 212715 3/1924 United Kingdom ................. 138/93

Primary Examiner—James E. Bryant, III
Attorney, Agent, or Firm—Herbert L. Lerner; Laurence A. Greenberg

[57] ABSTRACT

A sealing device is to be introduced through a manhole into a steam generator connected through a mouth of a connector to a pipeline with a restriction in the vicinity of the connector. The sealing device includes a plurality of serially disposed rubber hose seals defining an intermediate space therebetween to be pressure monitored. The rubber hose seals are subjected to a pressure medium. Feed rollers guide the sealing device. A bracing device has radially outwardly movable clamping blocks and clamping angles. The clamping blocks may be moved outward. The clamping elbow may be axially fixed against the mouth of the connector for bracing the moved out clamping blocks against the restriction.

8 Claims, 2 Drawing Sheets

SEALING DEVICE FOR A PIPELINE, IN PARTICULAR FOR A LOOP LINE OF A STEAM GENERATOR HEMISPHERE

The invention relates to a sealing device for a pipeline, in particular a loop line on a stream generator hemisphere, which has a restriction in the vicinity of the pipe connector.

U.S. Pat. No. 1,171,899 discloses a sealing device for pipelines which has inflatable sealing rings as well as a means for pressure monitoring an intermediate space between the sealing rings. Once introduced into a pipeline, the sealing device is only retained in the pipeline by the inflated sealing rings. Mechanical locking is not possible.

A similar sealing device which is inserted in the pipe connector region of pipelines, is known from U.S. Pat. No. 4,393,899. In order the brace the sealing device mechanically, a support must be disposed in the vessel into which the pipelines discharge, so that the sealing devices can be pressed into the pipeline connector while supported against one another in pairs by the support. This sealing device must at least be disposed in pairs, and the support must additionally be installed as well. U.S. Pat. No. 3,537,483 discloses the locking of an inflatable sealing device with locking hooks, which enable positioning of the sealing device in a pipeline. These locking hooks dig into a step of a pipeline, therey preventing motion of the sealing device in one direction.

It is accordingly an object of the invention to provide a sealing device for a pipeline, in particular for a loop line on a steam generator hemisphere which has a restriction in the vicinity of the pipe connector, that overcomes the hereinafore-mentioned disadvantages of the heretofore-known devices of this general type and that employs the restriction to provide a self-maintained sealing in two directions for high pressure loads.

With the foregoing and other objects in view there is provided, in accordance with the invention, a sealing device to be introduced through a manhole into a steam generator connected through a mouth of a connector to a pipeline with a restriction in the vicinity of the connector, comprising a plurality of serially disposed rubber hose seals defining an intermediate space therebetween to be pressure monitored, means for subjecting the rubber hose seals to a pressure medium, feed rollers for guiding the sealing device, a bracing device having radially outwardly movable clamping blocks and clamping angles, means for moving the clamping blocks outward, and means for axially fixing the clamping elbows against the mouth of the connector for bracing the moved out clamping blocks against the restriction.

In accordance with another feature of the invention, the restriction is in the form of a ring disposed in the connector.

In accordance with a further feature of the invention, the restriction of the connector has a conical support surface against which the clamping blocks are disposed.

In accordance with an added feature of the invention, the clamping blocks have sliding wheels for guidance, and the moving means include a spindle connected to the clamping blocks and a bevel gear for moving the clamping blocks outward.

In accordance with a concomitant feature of the invention, the clamping elbows form a stop for determining an insertion depth of the sealing device within the connector.

By comparison with the prior art structures, the sealing device according to the invention allows individual insertion without auxiliary means and it is distinguished by a simple bracing device, which assures a secure mechanical seat independently of the rubber hose seals. Furthermore, the rubber hose seals are not stressed by mechanical bracing forces of the sealing device, so that the possible pressure load is greater and and the service life is longer.

Other features which are considered as characteristic for the invention are set forth in the appended claims.

Although the invention is illustrated and described herein as embodied in a sealing device for a pipeline, in particular for a loop line on a steam generator hemisphere, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the folowing description of specific embodiments when read in connection with the accompanying drawings.

Figure 2:
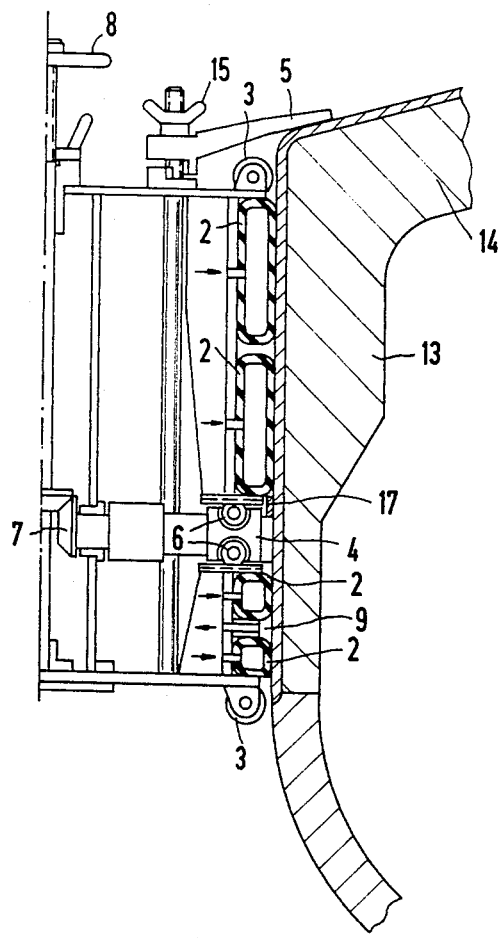

FIG. 1 is a fragmentary, diagrammatic, longitudinal-sectional view of a sealing device; and FIG. 2 is a view similar to a portion of FIG. 1 showing a pipe connector having a ring.

Referring now to the figures of the drawings in detail and first, particularly, to FIG. 1 thereof, there is seen a pipeline 12 having a pipe connector 13 which discharges into a steam generator 14. The pipeline 12 has a restriction 1 in the vicinity of the connector. A plurality of rubber hose seals 2 which are mutually aligned and are capable of being subjected to a pressure medium, are shown on the outer periphery of the sealing device. The seals are disposed in pairs for the sake of redundancy. The rubber hose seals 2 can be subjected to a pressure medium through pressure lines 10a, 10b, 10c, so that the required sealing is possible. An intermediate space 9, which is located between the first two rubber hose seals 2 as seen in the flow direction caused by an existing water pressure 11, is connected through a line 16 to leakage monitoring means.

The sealing device according to the invention is introduced into the steam generator through a manhole.

In order to introduce the sealing device into the pipeline 12, the sealing device has feed rollers 3, which provide rolling guidance in the pipeline 12. A bracking device is provided with radially outwardly deployable clamping blocks 4 and clamping angles or elbows 5 that can be placed against the mouth of the connector. The deployed clamping blocks 4 are braced against the restriction 1 by axial fixation of the clamping elbows.

It is advantageous if the restriction 1 is constructed in the form of a ring disposed in the connector 13. In this way, pipelines which do not have a restriction can be provided with the sealing device. Reference is also made to FIG. 1 in this connection.

It is particularly advantageous if the restriction 1 of the connector 13 has a conical support surface for the clamping blocks 4. On one hand, this centers the sealing device and on the other hand, it transmits pressing forces which are perpendicular to the support surface to the connector 13, thus providing for a uniform distribution of force.

Advantageously, the clamping blocks 4 are guided by sliding wheels 6 and are both connected to the spindle 8 and movable outward by a bevel gear 7. Precise deployment and bracing of the clamping blocks 4 against the restriction 1 are accordingly possible.

It is suitable for the clamping angles or elbows 5 to simultaneously serve as a stop for the insertion depth of the sealing device within the connector. This assures secure positioning of the clamping blocks 4 and thus simple installation of the sealing device.

In order to introduce the sealing device through a manhole into the steam generator, the clamping angles or elbows 5 are pivoted inward, making the diameter of the sealing device less than the inside diameter of the manhole. Once introduced into the steam generator, the clamping angles or elbows 5 are pivoted outward into the operating position thereof.

The introduction of the sealing device into the pipeline 12 takes place as follows:

The sealing device is in a starting position, which means that the clamping blocks 4 are retracted, the rubber hose seals 2 are empty and the clamping angles or elbows 5 are in a position corresponding to the dimensions of the connector.

The sealing device is introduced into the connector until it is stopped by the clamping angles or elbows 5, so that the clamping blocks 4 behind the restriction 1 are positioned in the enlarged portion of the pipeline 12. The clamping blocks 4 are driven out slightly by means of the spindle 8, so that the diameter of the sealing device is greater than the diameter of the connector region. The clamping blocks 4 are wedged against the conical restriction 1 of the pipeline 12 by tightening positioning wheels 15. At the same time, the sealing device is centered in the pipeline 12. By readjusting the clamping blocks 4 and the positioning wheels 15 once again, a firm bracing of the sealing device in the connector 13 is accomplished. The sealing device then has a firm mechanical seat. In order to perform the sealing function, the rubber hose seals 2 are then acted upon by a pressure medium thrugh the pressure line 10a, b, c.

In FIG. 2 shows a connector 13 of a pipeline 12 in which a sealing device is introduced. Since the connector 13 does not have any restrictions, a ring 17 is additionally provided, against which the clamping blocks 4 are braced.

The foregoing is a description corresponding in substance to German Application P 37 30 658.8, dated Sept. 11, 1987, the International priority of which is being claimed for the instant application, and which is hereby made part of this application. Any material discrepancies between the foregoing specification and the aforementioned corresponding German application are to be resolved in favor of the latter.

We claim:

1. Sealing device to be introduced through a manhole of a steam generator into a mouth of a connector connected between the steam generator and a pipeline, the connector having an inner surface with a radial restriction thereon, comprising a first end to be positioned against the connector while facing the pipeline, a second end, a plurality of serially disposed annular rubber hose seals defining chambers inside said rubber hose seals for receiving pressure medium and an intermediate space between said rubber hose seals to be pressure monitored, means for subjecting said rubber hose seals to the pressure medium, a bracing device at said first end having radially outwardly movable and guided clamping blocks, clamping elbows at said second end, means including a spindle and a bevel gear connected to said clamping blocks for moving said clamping blocks outward, and means for axially fixing said clamping elbows from inside the steam generator against the mouth of the connector for bracing said moved out clamping blocks against the restriction with the restriction disposed between said clamping elbows and said clamping blocks.

2. Sealing device according to claim 1, wherein said clamping blocks have a sharp adapted to be clamped against a restriction in the form of a ring disposed in the connector.

3. Sealing device according to claim 1, wherein the clamping blocks have a shape adapted to be clamped against a restriction of the connector with a conical support surface.

4. Sealing device according to claim 1, wherein said clamping blocks have sliding wheels for guidance.

5. Sealing device according to claim 1, wherein said clamping elbows form a stop for determining an insertion depth of the sealing device within the connector.

6. Sealing device to be introduced through a manhole of a steam generator into a mouth of a connector connected between the steam generator and a pipeline, comprising a first end to be positioned against the connector while facing the pipeline, a second end, a plurality of serially disposed annular rubber hose seals defining chamber inside said rubber hose seals for receiving pressure medium and an intermediate space between said rubber hose seals to be pressure monitored, means for subjecting said rubber hose seals to the pressure medium, a ring disposed in the connector, a bracing device at said first end having radially outwardly movable and guided clamping blocks, clamping elbows at said second end, means including a spindle and a bevel gear connected to said clamping blocks for moving said clamping blocks outward, and means for axially fixing said clamping elbows from inside the steam generator against the mouth of the connector for bracing said moved out clamping blocks against the ring with said ring disposed between said clamping elbows and said clamping blocks.

7. Sealing device according to claim 1, including feed rollers for guiding the sealing device in the connector.

8. Sealing device according to claim 6, including feed rollers for guiding the sealing device in the connector.

* * * * *